United States Patent
Kurokawa

(10) Patent No.: US 8,451,631 B2
(45) Date of Patent: May 28, 2013

(54) CONTROL APPARATUS OF POWER CONVERTER CIRCUIT

(75) Inventor: Fujio Kurokawa, Nagasaki (JP)

(73) Assignee: Nagasaki University, Nagasaki (JP)

( * ) Notice: Subject to any disclaimer, the term of this patent is extended or adjusted under 35 U.S.C. 154(b) by 26 days.

(21) Appl. No.: 12/741,471

(22) PCT Filed: Oct. 31, 2008

(86) PCT No.: PCT/JP2008/069986
§ 371 (c)(1),
(2), (4) Date: Jul. 22, 2010

(87) PCT Pub. No.: WO2009/060807
PCT Pub. Date: May 14, 2009

(65) Prior Publication Data
US 2010/0277956 A1    Nov. 4, 2010

(30) Foreign Application Priority Data
Nov. 6, 2007 (JP) .................................. 2007-288954

(51) Int. Cl.
*H02M 3/335* (2006.01)

(52) U.S. Cl.
USPC ..................................... 363/21.05; 363/21.13

(58) Field of Classification Search
USPC .................. 363/17, 18, 19, 20, 21.01, 21.02, 363/21.03, 21.04, 21.05, 132, 21.13
See application file for complete search history.

(56) References Cited

U.S. PATENT DOCUMENTS

| | | | |
|---|---|---|---|
| 5,986,895 A * | 11/1999 | Stewart et al. | 363/16 |
| 6,496,387 B2 * | 12/2002 | Halberstadt | 363/17 |
| 7,843,707 B2 * | 11/2010 | Chen et al. | 363/17 |
| 7,911,810 B2 * | 3/2011 | Shimada et al. | 363/17 |
| 2008/0192513 A1 * | 8/2008 | Kusubayashi | 363/21.01 |

FOREIGN PATENT DOCUMENTS

| | | |
|---|---|---|
| JP | 2007-006614 A | 1/2001 |
| JP | 2001-309657 A | 11/2001 |
| JP | 2003-023775 A | 1/2003 |
| JP | 2006-211832 A | 8/2006 |
| JP | 2007-020262 A | 1/2007 |

* cited by examiner

*Primary Examiner* — Nguyen Tran
(74) *Attorney, Agent, or Firm* — Kile Park Reed & Houtteman PLLC

(57) ABSTRACT

To detect a peak time of an exciting current of a transformer, a primary current corresponding to the peak time, or a variation time of the primary voltage, and to switch a switch after expiration of a predetermined period from the peak time, after the peak time occurs. A control apparatus 1 is applied to a power conversion circuit 2 which includes a switch circuit 23 including one switch or a plurality of switches and a transformer 21. The control apparatus includes: an output voltage detector 11 detecting a value of an output voltage of the power conversion circuit; an exciting current peak time generator 12 detecting a peak time of an exciting current of the transformer; a timing generator 13 generating a switching timing of the one switch or the plurality of switches. The timing generator 13 generates the switching timing of the one switch or the plurality of switches on the basis of the output voltage and the peak time.

3 Claims, 8 Drawing Sheets

CONTROL APPARATUS OF POWER CONVERTER CIRCUIT

TECHNICAL FIELD

The present invention relates to a control apparatus applied to a current resonance type power conversion circuit including a transformer, and more particularly, to a control apparatus which detects a peak time of an exciting current of the transformer, a primary current corresponding to the peak time, or a variation time of the primary current, and which switches a switch after expiration of a predetermined period from the peak time, after the peak time occurs.

BACKGROUND ART

In the past, there was known a general power conversion circuit of a DC output capable of controlling an output voltage by control of the switching frequency of a semiconductor switch (see Patent Documents 1 and 2).

For example, a power conversion circuit 9 shown in FIG. 8(A) includes a transformer 91, a switch circuit 93 disposed on the primary side of the transformer 91, a resonance circuit 92 connected in series to a primary coil 911 of the transformer 91, a rectifier circuit 94 disposed on the secondary side of the transformer 91, and a capacitor 95 disposed on the load of the rectifier circuit 94.

The switch circuit 93 is configured as a bridge circuit. The resonance circuit 92 includes an inductor 921 and a capacitor 922. In cooperation with the switching operation of the switch circuit 93 and the resonance of the resonance circuit 92, the DC power of a power source 98 is converted into an AC power and the AC power is applied to the primary coil 911. The AC power delivered from the primary coil 911 to a secondary coil 912 is applied to a load 98 via the rectifier circuit 94 and the smoothing capacitor 95.

As shown in FIG. 8(B), a control apparatus 8 acquires an output voltage $E_O$ of the power conversion circuit 9, compares the output voltage $E_O$ to a reference voltage $E_{REF}$, and transmits a driving signal, of which a frequency is converted, to the switch circuit 93.

Patent Document 1: JP-A-2003-023775
Patent Document 2: JP-A-2007-020262

DISCLOSURE OF THE INVENTION

Problem that the Invention is to Solve

In this control method, however, the output voltage $E_O$ is detected to control a switching frequency. Therefore, an input current is not detected. For this reason, a problem may arise in that when the current has not to be cut off, the current flowing in a switch is cut off and thus short-circuit current flows in another switch. From the viewpoint of the resonance operation, this problem is similar to a case where when a switch is turned on at a state where a resonant current flows, a resonance state is broken down, an operation becomes unstable, and thus a resonance type power converter may not execute the original function (that is, efficiency deteriorates). Surge (or ripple) occurs on the side of the power source and may have a bad influence on a peripheral circuit, thereby causing an erroneous operation.

An object of the invention is to provide a control apparatus of a power conversion circuit capable of detecting a current variation state on the primary side of a transformer, specifically, a peak time of an exciting current and generating a switching timing of a switch after expiration of a predetermined period from the peak time.

Means for Solving the Problem

According to aspects (1) to (7) of the invention, a power conversion circuit is provided.

(1) A control apparatus is applied to a power conversion circuit which includes a transformer and a switch circuit including one switch or a plurality of switches. The control apparatus includes: an output voltage detector detecting a value of an output voltage of the power conversion circuit; an exciting current peak time generator detecting a peak time of an exciting current of the transformer; and a timing generator generating a switching timing of the one switch or the plurality of switches. The timing generator generates the switching timing of the one switch or the plurality of switches on the basis of the output voltage and the peak time.

(2) In the control apparatus of the power conversion circuit according to aspect (1), the power conversion circuit may be of a current resonance type.

(3) In the control apparatus of the power conversion circuit according to aspect (1) or (2), the timing generator may count a time corresponding to a deviation between the output voltage and a reference voltage from the peak time to generate the switching timing.

(4) In the control apparatus of the power conversion circuit according to any one of aspects (1) to (3), the exciting current peak time generator may detect the peak time on the basis of a variation in a primary current or the primary voltage of the transformer.

(5) In the control apparatus of the power conversion circuit according to any one of aspects (1) to (4), the switch circuit may include one switch or a plurality of switches forming a bridge arm.

(6) In the control apparatus of the power conversion circuit according to any one of aspects (1) to (5), all of the output voltage detector, the exciting current peak value detector, and the timing generator may be configured by an analog circuit or a digital circuit, or some thereof may be configured by an analog circuit and the other thereof may be configured by a digital circuit.

In order to detect the peak time of the exciting current, for example, not only the primary voltage or the primary current (or instead of the primary voltage or the primary current) but also a secondary voltage or a secondary current is measured. The same time of the exciting current as the peak time may be specified by a variation in the measured values of the same time and the peak time (specifically, the variation in the deferential values of the measured values).

According to the aspects of the invention, the peak time of the exciting current of the transformer is detected by the exciting current peak time detector. However, instead of the peak time, by detecting the primary current of the transformer, the timing generator can generate the switching timing of the switch.

In this case, the control apparatus may be provided according to aspects (1') to (5').

(1') A control apparatus is applied to a power conversion circuit which includes a transformer and a switch circuit including one switch or a plurality of switches. The control apparatus includes: an output voltage detector detecting a value of an output voltage of the power conversion circuit; an exciting current peak time detector detecting a peak time of an exciting current of the transformer; a timing generator generating a switching timing of the one switch or the plurality of switches. The timing generator generates the switching timing of the one switch or the plurality of switches on the basis of the output voltage and the peak time.

(2') In the control apparatus of the power conversion circuit according to aspect (1'), the timing generator may detect the peak value of the primary current and may generate a switching timing of the one switch or the plurality of switches on the basis of the output value and the peak value.

(3') In the control apparatus of the power conversion circuit according to aspect (1') or (2'), the timing generator may multiply a difference between the detected value of the output voltage and a reference value by a coefficient (<0), calculate a value $\epsilon$ by adding a voltage bias value to the multiplication value, perform a frequency compensation process on the value $\epsilon$, calculate a difference between a value $\epsilon_F$ subjected to the frequency compensation process and a voltage conversion value of the peak value, and generate the switching timing of the one switch or the plurality of switches on the basis of this difference.

(4') In the control apparatus of the power conversion circuit according to any one of aspects (1') to (3'), the switch circuit may include one switch or a plurality of switches forming a bridge arm.

(5') In the control apparatus of the power conversion circuit according to any one of aspects (1') to (4'), all of the output voltage detector, the primary current peak value detector, and the timing generator may be configured by an analog circuit or a digital circuit, or some thereof may be configured by an analog circuit and the other thereof may be configured by a digital circuit.

When the primary current is controlled, it is possible to correspond to an increase or decrease in load. Of course, it is possible to generate the switching timing of the switch so as to suppress a variation in the primary current of the transformer. In this way, since the power current becomes stable and the peak value of the primary current can be suppressed, the switch circuit (switch element) can be protected.

ADVANTAGE OF THE INVENTION

A control apparatus according to the invention detects the state of a current variation on the primary side of a transformer (specifically, detects the peak time of an exciting current) and generates a switching timing of a switch when a predetermined period expires from the peak time. Accordingly, it is possible to prevent the circuit from being short-circuited or opened.

DESCRIPTION OF REFERENCE NUMERALS AND SIGNS

1: CONTROL APPARATUS
2: POWER CONVERSION CIRCUIT
11: OUTPUT VOLTAGE DETECTING UNIT
12: PRIMARY CURRENT PEAK TIME DETECTING UNIT
13: TIMING GENERATING UNIT
21: TRANSFORMER
22: RESONANCE CIRCUIT
23: SWITCH CIRCUIT
121: PRIMARY CURRENT DETECTOR
122: CURRENT DATA BUFFER
131: VOLTAGE DATA BUFFER
132: AVERAGE VOLTAGE CALCULATOR
133: DEVIATION CALCULATOR
134: FILTER
135: TIMING GENERATOR
211: PRIMARY COIL
212: SECONDARY COIL
221: INDUCTOR
222: CAPACITOR
$Q_1$: FIRST SWITCH
$Q_2$: SECOND SWITCH

BEST MODE FOR CARRYING OUT THE INVENTION

Figure 1:
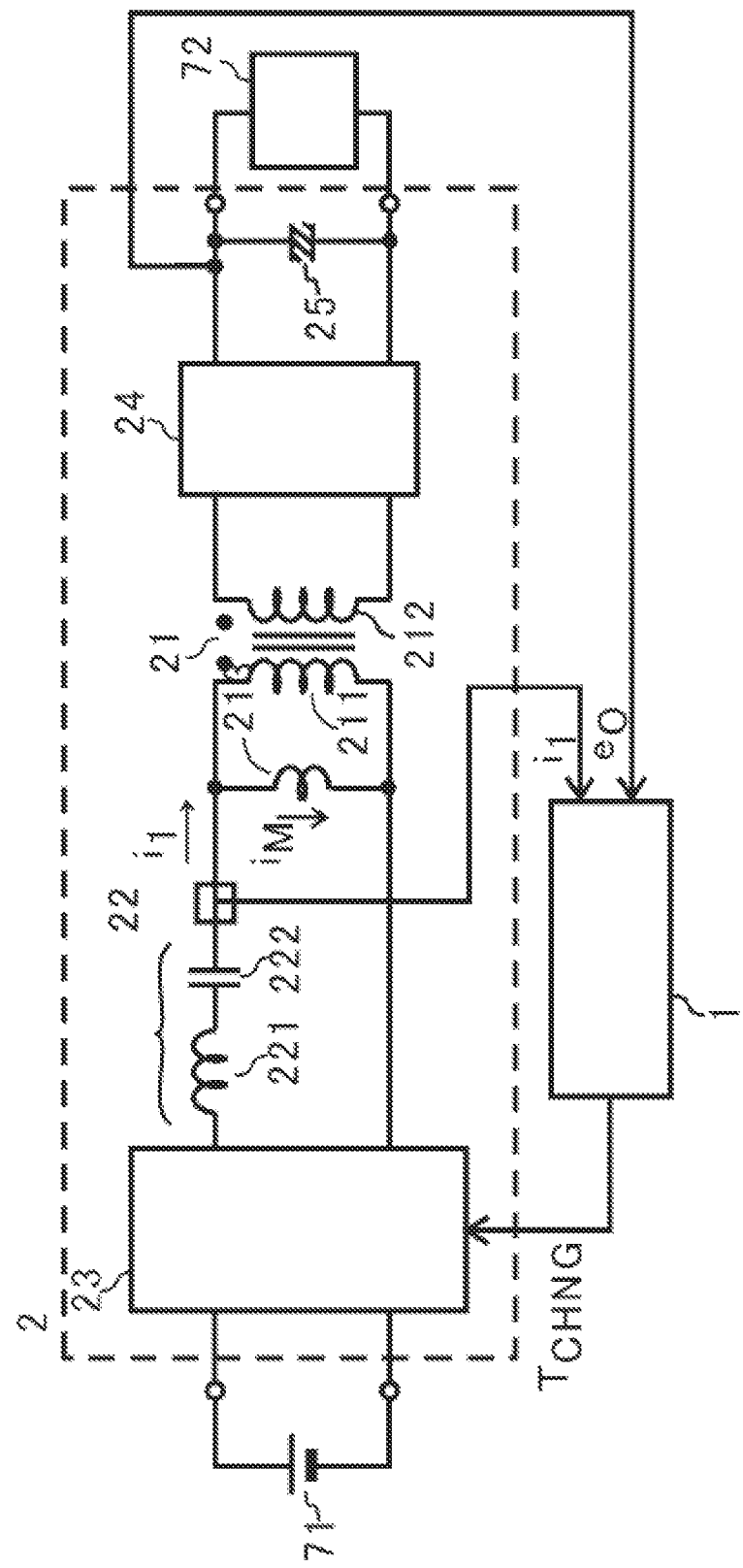
FIG. 1 is an explanatory diagram (a circuit diagram illustrating a power conversion circuit and a control apparatus) illustrating a control apparatus according to an embodiment of the invention.

FIG. 1 is a diagram illustrating a control apparatus according to an embodiment of the invention. In FIG. 1, a power conversion circuit 2 is controlled by a control apparatus 1. The power conversion circuit 2 includes a transformer 21. On the primary side of the transformer 21, there are disposed a switch circuit 23 and a resonance circuit 22 connected in series to a primary coil 211 between the transformer 21 and the switch circuit 23. FIG. 1 shows an equivalent circuit in which the primary coil 211 and an exciting coil 213 are connected in parallel to each other on the primary side.

The resonance circuit 22 includes: an inductor 221 of the transformer 21 connected in series to the primary coil 211 of the transformer 21; and a capacitor 222. A part or the whole of the inductor 221 may be configured as a stray inductor. A part or the whole of the capacitor 222 may be configured as a stray capacitor.

On the secondary side of the transformer 21, there are disposed a rectifier circuit 24 and a smoothing capacitor connected in parallel to an output terminal of the rectifier circuit 24.

Figure 2:
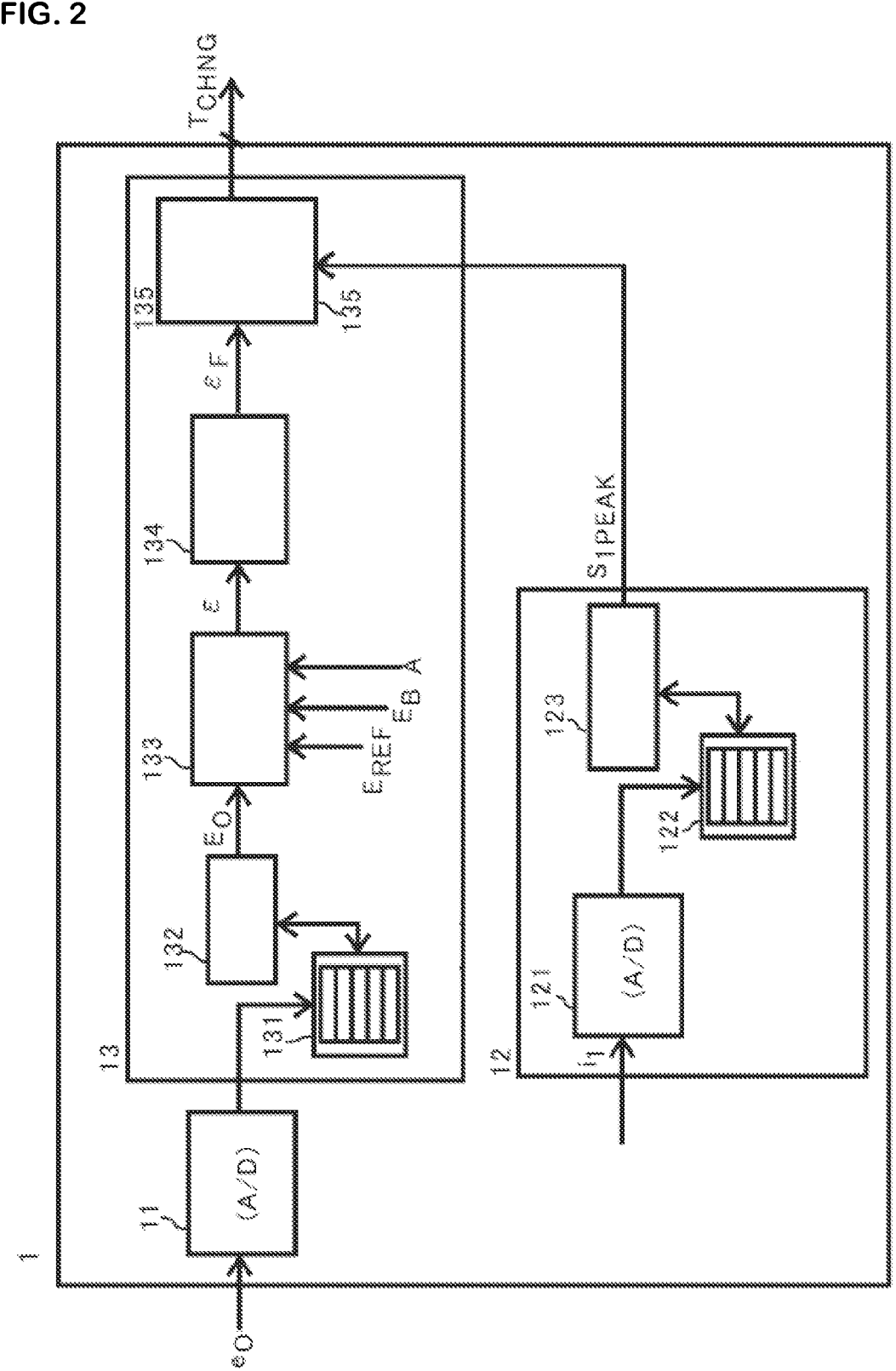
FIG. 2 is a block diagram illustrating the control apparatus in FIG. 1.

As shown in FIG. 2, the control apparatus 1 includes an output voltage detecting unit 11, an exciting current peak time detecting unit 12, and a timing generating unit 13. The timing generating unit 13 performs a digital process, which is described below, on the basis of a digital signal from the output voltage detecting unit 11 and a digital signal from the exciting current peak time detecting unit 12.

Figure 3:
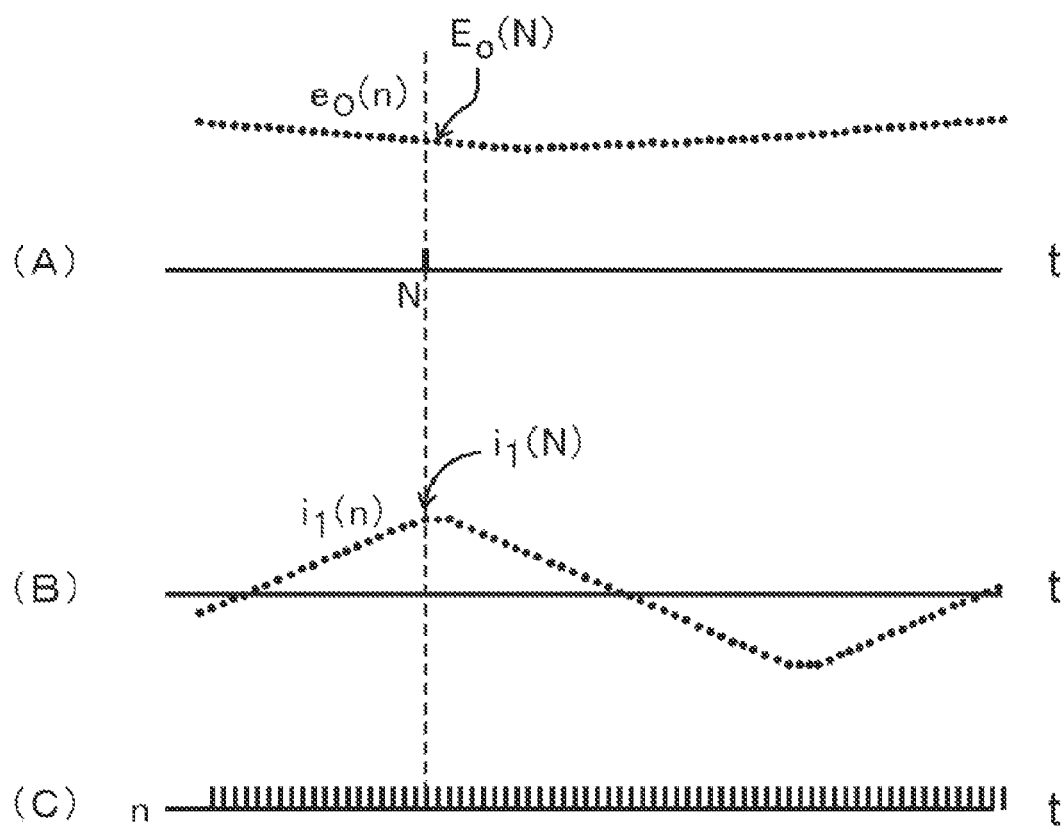
FIG. 3(A) is a diagram illustrating a state in which an output voltage is sampled and subjected to A/D conversion.
FIG. 3(B) is a diagram illustrating a state in which a primary current is sampled and subjected to A/D conversion.
FIG. 3(C) is a diagram illustrating a sampling period.

The output voltage detecting unit 11 receives an instantaneous value $e_O$ of an output voltage at a sampling period n (see FIG. 3(C)) and performs A/D conversion on the instantaneous value $e_O$ (see FIG. 3(A)).

The exciting current peak time detecting unit 12 includes a primary current detector 121, a voltage data buffer (FIFO) 122, and a peak time detector 123. The primary current detector 121 receives an instantaneous value $i_1$ of a primary current of the transformer 21 at the sampling period n (which may be different from the sampling period of $e_O$, but is the same period here) and performs A/D conversion on the instantaneous value $i_1$ (see FIG. 3(B)).

The timing generating unit 13 includes a voltage data buffer (FIFO) 131, an average voltage calculator 132, a deviation calculator 133, a filter (a frequency compensation circuit in the invention) 134, and a timing generator 135.

The output voltage $e_O$ transmitted from the output voltage detecting unit 11 is transmitted to the voltage data buffer 131. The average voltage calculator 132 calculates an output voltage $E_O$ with reference to the voltage data buffer 131. $E_O$ is an average value or an effective value of the output voltage. The deviation calculator 133 inputs the output voltage $E_O$, receives a reference voltage value $E_{REF}$, a coefficient A (where A<0), and a bias voltage value $E_B$, and calculates a deviation $\epsilon$:

$$\epsilon = A(E_O - E_{REF}) + E_B \quad (1).$$

The deviation $\epsilon$ is processed by the filter 134. A value after the filter processing is denoted by $\epsilon_F$.

On the other hand, the primary current $i_1$ transmitted from the primary current detector 121 is transmitted to the current data buffer 122. The peak time detector 123 detects a variation in the primary current $i_1$ with reference to the current data buffer 122. By storing a variation pattern of the primary current $i_1$, the peak value of an exciting current $i_M$ can be detected. In this embodiment, the peak value detector 136 can detect a peak value $I_M$, when a time variation of $i_1(n)-i_1(n-1)$ is infinite or infinitesimal.

The peak time detector 123 outputs a signal $S_{PEAK}$ indicating a peak value time to the timing generator 135, when the peak time detector 123 detects the peak value $I_M$.

The timing generator 135 generates a switching timing $T_{CHNG}$ of a switch of the switch circuit 23. When the signal $S_{PEAK}$ is received, a counter can start counting clocks of a predetermined frequency. When the counter ends the counting of a predetermined number (time corresponding to $\epsilon_F$), the switching timing $T_{CHNG}$ may be generated on the basis of a signal indicating the end of the counting. The switching timing $T_{CHNG}$ is a time which is individually applied to each of switches, when the switch circuit 23 includes the plurality of switches.

Figure 4:
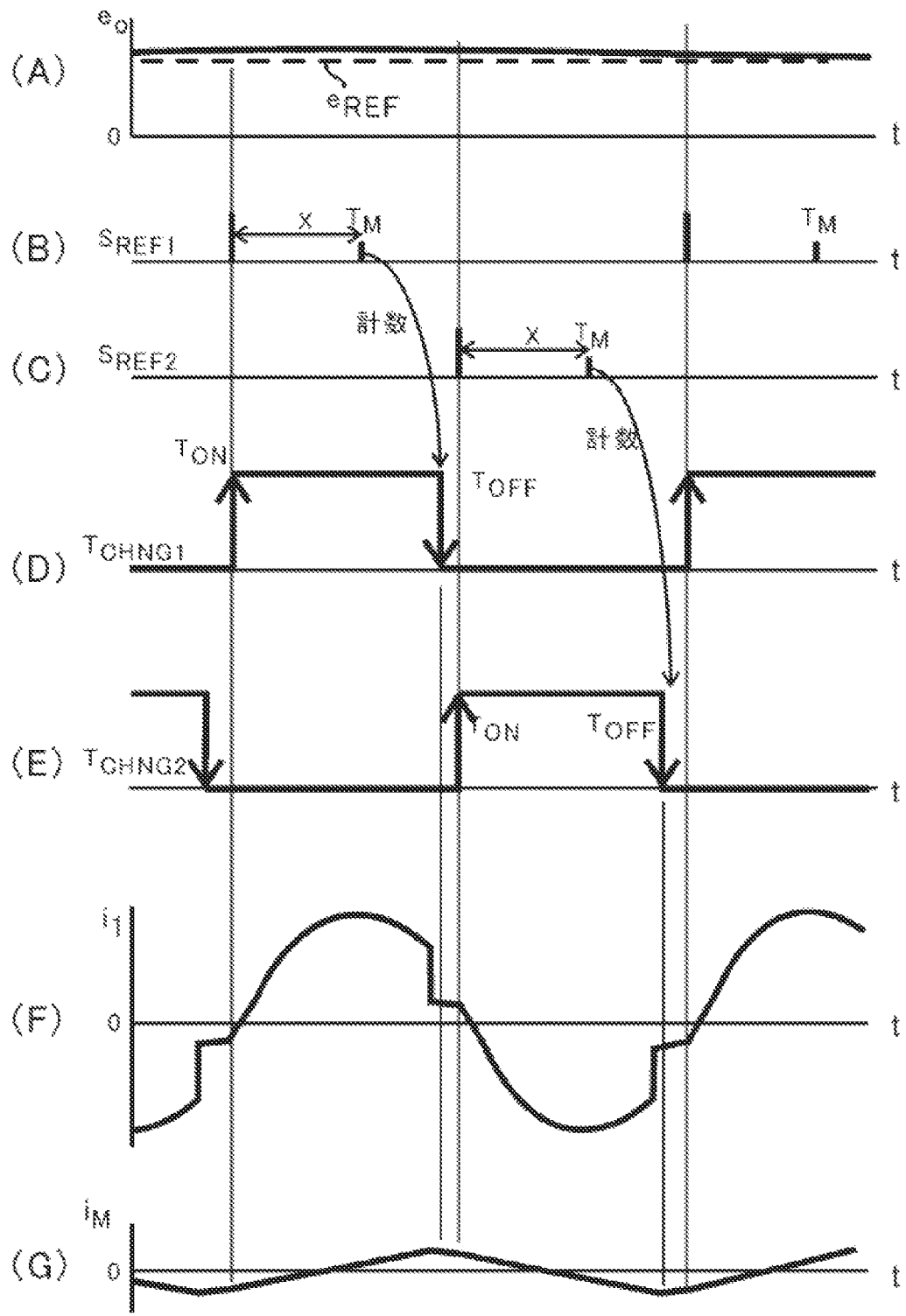
FIGS. 4(A) to 4(G) are timing diagrams illustrating generation of ON timing of two switches by a timing generator on the basis of a primary current peak time.

The switch circuit 23 includes two switches, when the switch circuit is a half-bridge circuit. In this case, the timing generator 135 generates the switching timing for each of the two switches (hereinafter, referred to as first and second switches). In FIGS. 4(D) and 4(E), which are described below, the switching timing of the first switch is denoted by $T_{CHNG1}$ and the switching timing of the second switch is denoted by $T_{CHNG2}$.

Hereinafter, referring to FIGS. 4(A) and 4(G), a case will be described in which the timing generator 135 generates an ON timing $T_{ON}$ and an OFF timing $T_{OFF}$ of the first and second switches on the basis of the signal $S_{PEAK}$.

As shown in FIG. 4(A), for example, it is necessary for the control circuit 1 to control the switch circuit 23 so as to reduce power supply, when the output voltage $E_O$ exceeds the reference voltage $E_{REF}$.

At this time, the value (see Expression (1)) of $\epsilon$ decreases and the OFF timing $T_{OFF}$ of the switch becomes early. For example, the OFF timing $T_{OFF}$ of the first switch can be determined by an increase or decrease in the number M of clocks from the signal $S_{PEAK}$. The OFF timing $T_{OFF}$ of the second switch is also generated as in the OFF timing of the first switch, as shown in FIGS. 4(C) and (E).

FIG. 4(F) shows the primary current $i_1$ and FIG. 4(G) shows an exciting current of the transformer 21. In this embodiment, since the control apparatus 1 controls the switch circuit 23 on the basis of a parameter (that is, the exciting current $i_M$) on the primary side of the transformer 21, it is easy to correspond to a variation in the primary current.

Figure 5:
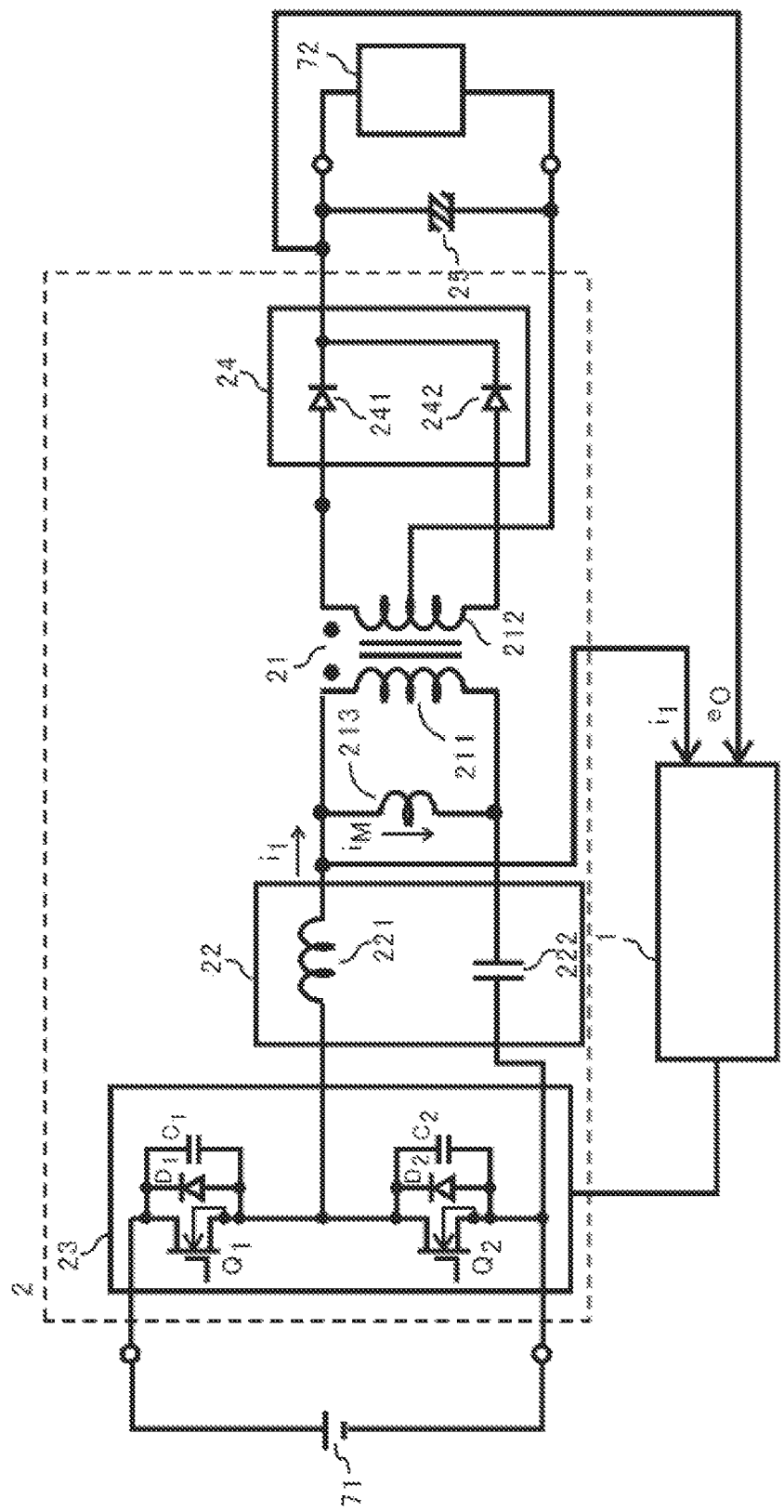
FIG. 5 is a circuit diagram illustrating the power conversion circuit in FIG. 1 in detail according to the embodiment of the invention.

FIG. 5 is a circuit diagram illustrating the power conversion circuit 2 in FIG. 1 in detail.

In FIG. 5, the switch circuit 23 is configured as a half-bridge circuit. Two switches (the first and second switches) forming two arms are denoted by $Q_1$ and $Q_2$. A snubber circuit (where $Q_1$ includes a diode $D_1$ and a capacitor $C_1$ and $Q_2$ includes a diode $D_2$ and a capacitor $C_2$) is connected to each of the first switch $Q_1$ and the second switch $Q_2$.

In FIG. 5, the rectifier circuit 24 is configured as a diode-bridge circuit. Reference Numerals 241 and 242 denote two diodes forming two arms.

Figure 6:
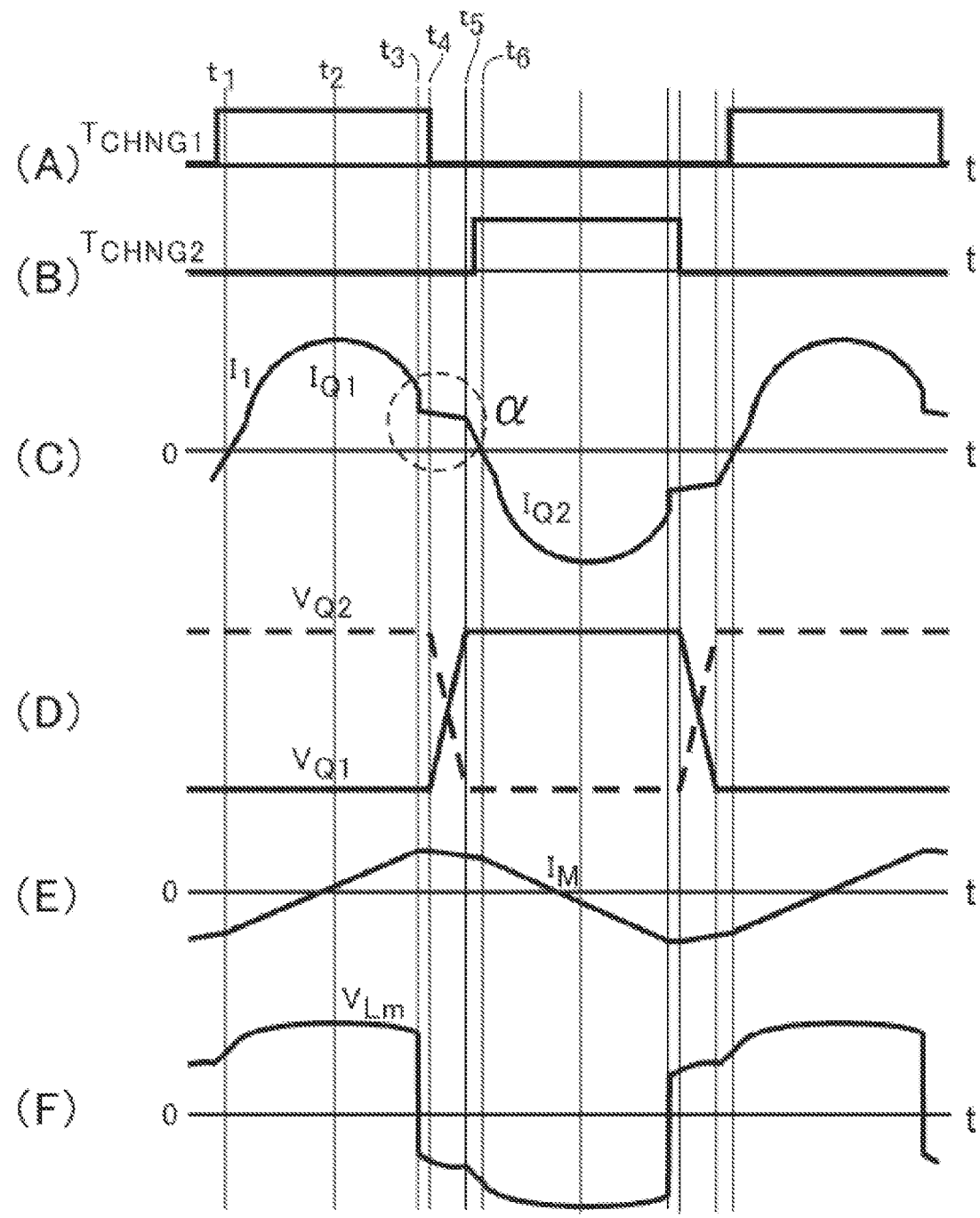
FIGS. 6(A) to 6(F) are timing diagrams illustrating an operation of the control apparatus in FIG. 5.

FIG. 6(A) shows the switching timing $T_{CHNG1}$ to be applied to the first switch $Q_1$. FIG. 6(B) shows the switching timing $T_{CHNG2}$ to be applied to the second switch $Q_2$. FIG. 6(C) shows a primary current $i_1$ (a current flowing in the first switch $Q_1$: $i_{Q1}$ and a current flowing in the second switch $Q_2$: $i_{Q2}$) and a primary current peak value $i_{1PEAK}$. FIG. 6(D) shows terminal voltages $V_{Q1}$ and $V_{Q2}$ of the first switch $Q_1$ and the second switch $Q_2$, respectively. FIG. 6(E) shows the exciting current $i_M$. FIG. 6(F) shows a voltage of the exciting coil 213.

When the first switch $Q_1$ is turned on, the primary current $i_1$ flows only to the first switch $Q_1$ (see $t_1$), $i_1$ reaches the peak (see $t_2$) and drops, the current flowing to the first switch $Q_1$ is formed only by the exciting current of the transformer 21 (see $t_3$ and a of FIG. 6(C)). $t_3$ is the peak time $S_{PEAK}$ of the exciting current. The timing generating unit 13 performs counting of predetermined timings and generates the OFF timing of the first switch $Q_1$, and then the first switch $Q_1$ is turned off (see $t_4$).

Subsequently, a reverse voltage is temporarily applied to the second switch $Q_2$ (a reverse current starts flowing via the capacitor $C_2$ of the snubber circuit) (see $t_5$), but a forward voltage is immediately applied (see $t_6$). The second switch $Q_2$ is turned on between time $t_5$ and time $t_5$. Hereinafter, the second switch $Q_2$ performs the same operation as that of the first switch $Q_1$.

When a period between time $t_3$ and $t_4$ is short, a period in which the second switch $Q_2$ is turned on is made short (the power supplied to the load is increased). Alternatively, when the period between time $t_3$ and $t_4$ is long, the period in which the second switch $Q_2$ is turned on is made long (the power supplied to the load is decreased).

Figure 7:
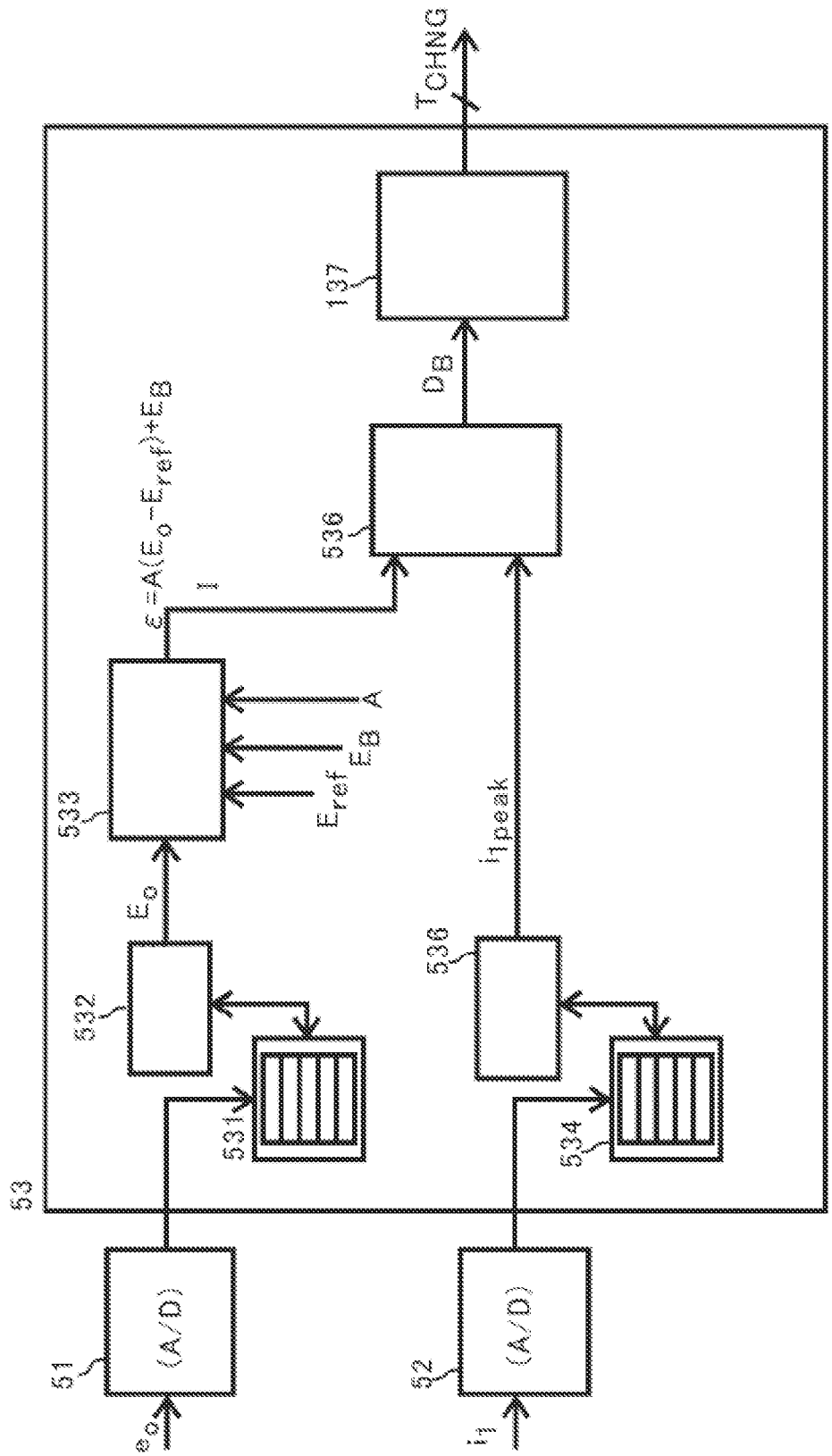
FIG. 7 is an explanatory diagram illustrating a basic example of the control apparatus controlling a primary current.
Figure 8:
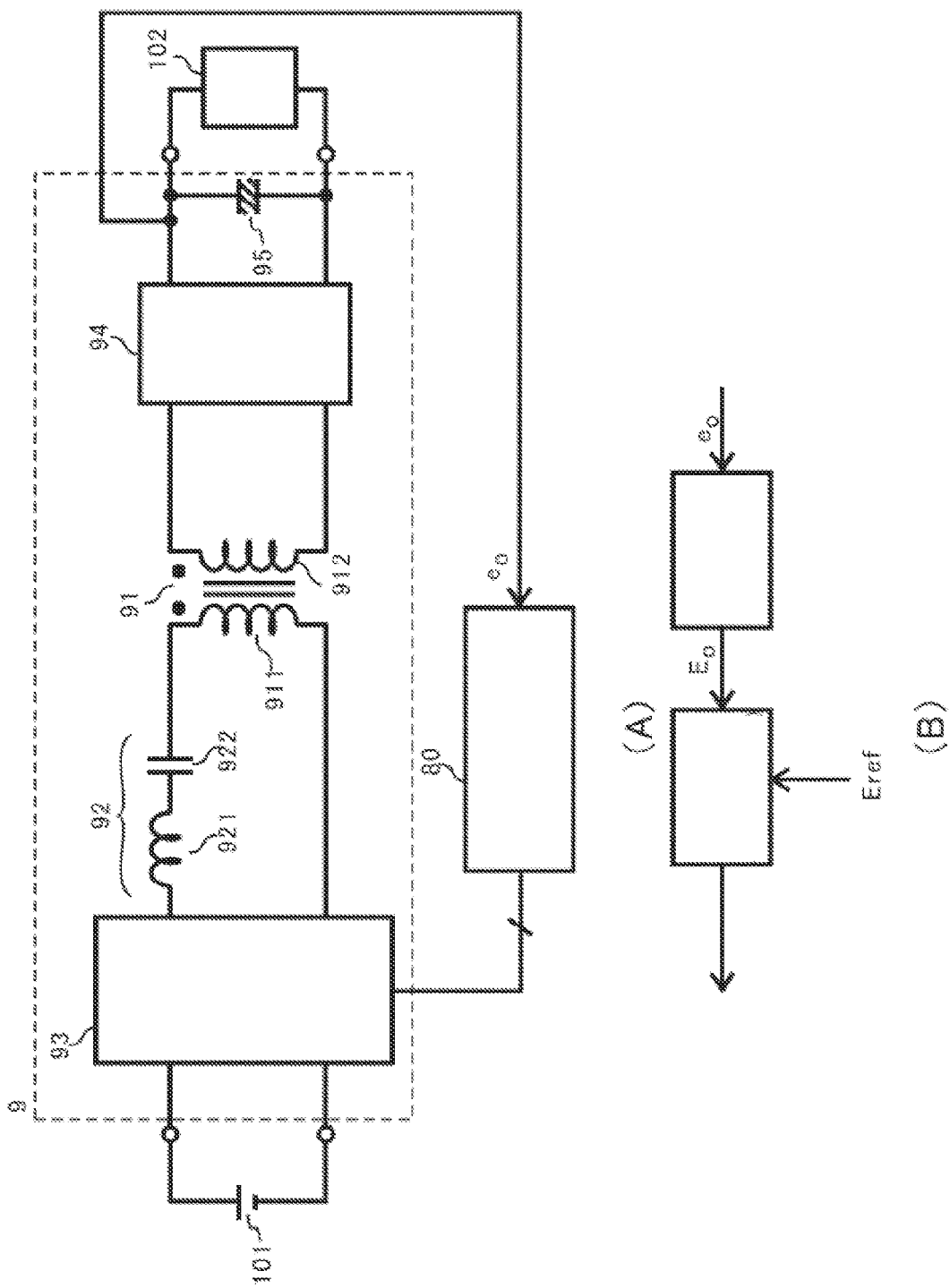
FIG. 8 is an explanatory diagram illustrating a known control technique.

FIG. 7 is a diagram illustrating an example in which the primary current is controlled. In this case, the primary current can correspond to an increase or decrease in load. Of course, the switching timing of the switch can be generated so as to suppress the variation in the primary current of the transformer. Therefore, the power current becomes stable. Moreover, since the peak value of the primary current can be restrained, the switch circuit (switch element) can be protected.

As shown in FIG. 7, a control apparatus 5 includes an output voltage detecting unit (corresponding to an output detector according to the invention) 51, a primary current detecting unit 52, and a timing generating unit 53. The timing generating unit 53 performs a digital process, which is described below, on the basis of a digital signal from the output voltage detecting unit 51 and a digital signal from the primary current detecting unit 52.

The output voltage detecting unit 51 receives an instantaneous value $e_O$ of the output voltage at a sampling period n and performs A/D conversion. The primary current detecting unit 52 receives an instantaneous value $i_1$ of the primary current of the transformer 21 at the sampling period n (which may be different from the sampling period of $e_O$, but is the same period here) and performs A/D conversion on the instantaneous value $i_1$.

The timing generating unit 53 includes a voltage data buffer (FIFO) 531, an average voltage calculator 532, a deviation calculator 533, a filter (a frequency compensation circuit in the invention) 534, a current data buffer (FIFO) 535, a peak value detector 536, a digital difference section 537, and a timing generator 538.

The output voltage $e_O$ received from the output voltage detector 51 is transmitted to the voltage data buffer 531. The average voltage calculator 532 calculates the output voltage $E_O$ with reference to the voltage data buffer 531. $E_O$ is an average value or an effective value of the output voltages. The deviation calculator 533 inputs the output voltage $E_O$ and receives the reference voltage value $E_{REF}$, the coefficient A (where A<0), and the bias voltage value $E_B$ to calculate the deviation $\epsilon$:

$$\epsilon = A(E_O - E_{REF}) + E_B.$$

The deviation $\epsilon$ is processed by the filter 534. A value after the filter processing is denoted by $\epsilon_F$.

On the other hand, the primary current $i_1$ transmitted from the primary current detector 52 is transmitted to the current data buffer 535. The peak value detector 536 detects a peak value $i_{1PEAK}$ of the primary current $i_1$ with reference to the current data buffer 535. For example, the peak value detector 536 may set $i_1(n)$ to $i_{1PEAK}$, when a variation in $i_1(n)-i_1(n-1)$ is the minimum. $i_{PEAK}$ is the absolute value and a positive value in this embodiment.

The digital difference section 537 calculates a difference value $D_B$ between the value $\epsilon_F$ and a voltage conversion value of the peak value $i_{1PEAK}$ and transmits the difference value $D_B$ to the timing generator 538. The timing generator 538 generates the switching timing $T_{CHNG}$ of the switches of the switch circuit 23 on the basis of the difference value $D_B$. The switching timing $T_{CHNG}$ is a timing which is applied to each switch, when the switch circuit 23 includes the plurality of switches.

The switch circuit 23 includes two switches, when the switch circuit 23 is a half-bridge circuit. In this case, the timing generator 538 generates the switching timing for the two switches.

The invention claimed is:

1. A control apparatus applied to a resonance type power conversion circuit comprising a transformer and a switch circuit comprising one switch or a plurality of switches, the control apparatus comprising:
   an output voltage detector detecting a value of an output voltage of the power conversion circuit;
   an exciting current peak time detecting unit to detect a peak time of an exciting current of the transformer, the exciting current peak time detector comprising:
      a peak time detector data buffer to store a value of a primary current of the transformer sequentially; and
      a peak time detector to detect the exciting current peak time based on data stored in the peak time detector data buffer; and
   a timing generator to generate switch timing signals on the basis of the output voltage and the peak time, the timing generator comprising:
      a timing generator data buffer to store an output voltage of the power conversion circuit;
      an average voltage calculator to calculate an average of the output voltage based on data stored in the timing generator data buffer;
      a deviation calculator to detect a deviation between an output of the average voltage calculator and a reference voltage and to calculate a time corresponding to the deviation; and
      a timing generating circuit to generate an off timing signal for a first switch after passage of the calculated time following detection of the peak time by the peak time detector and an on timing signal for a second switch after a reverse voltage is applied to the second switch after the first switched is turned off and before a forward voltage is applied to the second switch.

2. The control apparatus according to claim 1, wherein the exciting current peak time detecting unit detects the peak time on the basis of a variation in a primary current or a primary voltage of the transformer.

3. The control apparatus according to claim 1, wherein at least one of the output voltage detector, the exciting current peak time detecting unit, and the timing generator comprises an analog circuit or a digital circuit.

* * * * *